US010290159B2

(12) United States Patent
Hagan, Jr.

(10) Patent No.: US 10,290,159 B2
(45) Date of Patent: May 14, 2019

(54) POTENTIAL CHASSIS DAMAGE IDENTIFICATION, VALIDATION, AND NOTIFICATION

(71) Applicant: FORD GLOBAL TECHNOLOGIES, LLC, Dearborn, MI (US)

(72) Inventor: Daniel Lee Hagan, Jr., Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 15/041,782

(22) Filed: Feb. 11, 2016

(65) Prior Publication Data

US 2017/0236340 A1 Aug. 17, 2017

(51) Int. Cl.

| | |
|---|---|
| ***G01M 17/00*** | (2006.01) |
| ***G06F 7/00*** | (2006.01) |
| ***G06F 19/00*** | (2018.01) |
| ***G07C 5/08*** | (2006.01) |
| ***G07C 5/00*** | (2006.01) |
| ***G07C 5/10*** | (2006.01) |
| *A01B 69/00* | (2006.01) |
| *B62D 6/00* | (2006.01) |

(Continued)

(52) U.S. Cl.
CPC ........... *G07C 5/0808* (2013.01); *G07C 5/006* (2013.01); *G07C 5/008* (2013.01); *G07C 5/10* (2013.01); *G07C 5/0825* (2013.01)

(58) Field of Classification Search
CPC .... G07C 5/0808; G07C 5/006; B62D 5/0472; G01M 17/007; G01M 17/04; G08G 1/123
USPC ................. 701/31.7, 41, 33.8, 31.4; 340/989
See application file for complete search history.

(56) References Cited

U.S. PATENT DOCUMENTS 5,269,186 A 12/1993 Yopp
5,760,938 A 6/1998 Hodge
(Continued)

FOREIGN PATENT DOCUMENTS

DE 102009053404 A1 5/2011

OTHER PUBLICATIONS

Saravanan et al., "Impact Detection For Smart Automotive Damage Mitigation Systems", Abstract Only: Issue Date: 2000; Source Title: Proceedings of SPIE—The International Society for Optical Engineering; Source: http://www.engineeringvillage2.org/controller/servlet/Controller?CID=quickSearchDetailedFormat&SEARCHID=31317012e46730a287aadprod4data2&DOCINDEX=9&database=1&format=quickSearchDetailedFormat.

*Primary Examiner* — Mahmoud S Ismail
(74) *Attorney, Agent, or Firm* — Ray Coppiellie; Brooks Kushman P.C.

(57) ABSTRACT

A vehicle has one or more accelerometers for detecting acceleration of a chassis component. One or more separate sensors are also provided in the vehicle. A controller is programmed to receive a signal indicating acceleration from the one or more accelerometers, wherein the acceleration is between a lower threshold that indicates normal vehicle operation and an upper threshold which would otherwise set off restraint devices, such as airbags for example. When the acceleration is between the thresholds, a potential-chassis-damage signal can be locally created or sent. The controller then validates the potential-chassis-damage signal based on the signals received from the separate sensors. Upon validation, the controller outputs a message to a display, such as a display screen inside the vehicle or an OBD diagnostic tool, warning a user of potential-chassis damage.

19 Claims, 4 Drawing Sheets

(51) Int. Cl.

| | |
|---|---|
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 17/00* | (2019.01) |
| *G08G 1/123* | (2006.01) |

(56) References Cited

U.S. PATENT DOCUMENTS

| | | | | |
|---|---|---|---|---|
| 6,272,412 | B1 | 8/2001 | Wu et al. | |
| 7,973,653 | B2 | 7/2011 | Adachi | |
| 2007/0032952 | A1 | 2/2007 | Carlstedt et al. | |
| 2007/0213943 | A1 | 9/2007 | Curry et al. | |
| 2007/0229240 | A1 | 10/2007 | Yasuda | |
| 2008/0228352 | A1 | 9/2008 | Brookes et al. | |
| 2009/0102631 | A1 | 4/2009 | Aoki et al. | |
| 2009/0204287 | A1 | 8/2009 | Blanz et al. | |
| 2009/0228178 | A1 | 9/2009 | Jess et al. | |
| 2009/0248253 | A1 | 10/2009 | Le et al. | |
| 2010/0057290 | A1 | 3/2010 | Brillhart et al. | |
| 2012/0029763 | A1 | 2/2012 | Hering | |
| 2012/0053791 | A1 | 3/2012 | Harada | |
| 2012/0205887 | A1 | 8/2012 | Stander et al. | |
| 2013/0069802 | A1* | 3/2013 | Foghel | G08G 1/205<br>340/989 |
| 2013/0158779 | A1 | 6/2013 | Gloos et al. | |
| 2014/0018999 | A1* | 1/2014 | Adams | G01M 17/04<br>701/31.4 |
| 2014/0257627 | A1* | 9/2014 | Hagan, Jr. | G01M 17/007<br>701/33.8 |
| 2014/0303848 | A1* | 10/2014 | Bean | B62D 5/0472<br>701/41 |

* cited by examiner

POTENTIAL CHASSIS DAMAGE IDENTIFICATION, VALIDATION, AND NOTIFICATION

TECHNICAL FIELD

The present disclosure relates to utilizing sensors in a vehicle to detect potential chassis damage, validating the detection of the potential damage, and notifying the operator of the vehicle of potential chassis damage upon positive validation.

BACKGROUND

A chassis consists of an internal framework that supports a vehicle. A chassis typically consists of a frame, a suspension system, and ground-contact components such as wheels. A suspension system typically consists of springs, shock absorbers and linkages that connect the vehicle's ground-contact components to its frame. The chassis contributes to the vehicle's driving, steering and braking while keeping occupants comfortable and reasonably well isolated from noise, bumps, and vibrations. The suspension system maintains the ground-contact components in contact with the ground surface as much as possible to allow for safe driving, steering and braking of the vehicle.

Chassis systems are typically tuned so that an unsprung mass of the vehicle follows the changing contours of the ground while a sprung mass of the vehicle maintains a steady and smooth ride. Damage to the chassis may reduce vehicle handling, steerability, and brakeability. In some situations, an occupant of the vehicle can detect potential damage done to the chassis based on tire pressure loss, visible tire damage, wheel imbalance, visible wheel damage, ride quality changes, suspension noise, and steering system changes.

Drive-by-wire, steer-by-wire and brake-by-wire systems increase the difficulty for a driver to detect potential chassis damage. And, drivers of vehicles that are shared by multiple drivers may not know about, notice, or care about potential chassis damage that occurred during a prior user's operation of the vehicle. Pool and rental vehicles may be inspected when the vehicle is turned in, but in a scenario where the hand-off of the vehicle occurs without a check-in inspection, or an inspection of sufficient detail, the subsequent driver could be unaware that they are operating a vehicle with chassis damage present.

SUMMARY

According to one embodiment, a vehicle comprises an accelerometer for detecting acceleration of a chassis component, one or more sensors, and a controller. The controller is programmed to validate a potential chassis damage signal from the accelerometer that is between a lower threshold and an upper threshold associated with triggering a supplemental restraint based on signals received from the one or more sensors exceeding corresponding thresholds. The controller is further programmed to output a message to a display in response to the validation.

According to another embodiment, a method comprises receiving a signal from an accelerometer indicating acceleration of a chassis component. The method also includes validating potential chassis damage based on the acceleration being between a lower threshold unlikely to cause chassis damage and an upper threshold likely to cause chassis damage and signals received from one or more sensors being consistent with potential chassis damage. A signal is then outputted to a display in response to the validating.

According to yet another embodiment, a vehicle comprises a primary accelerometer configured to detect vertical acceleration of a front wheel, and a plurality of secondary accelerometers. A controller is programmed to output a potential chassis damage message to a display in response to (i) the vertical acceleration being positive but less than a triggering threshold for a supplemental restraint, and (ii) acceleration fluctuations received from the secondary accelerometers based on distance from the front wheel indicative of potential chassis damage

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
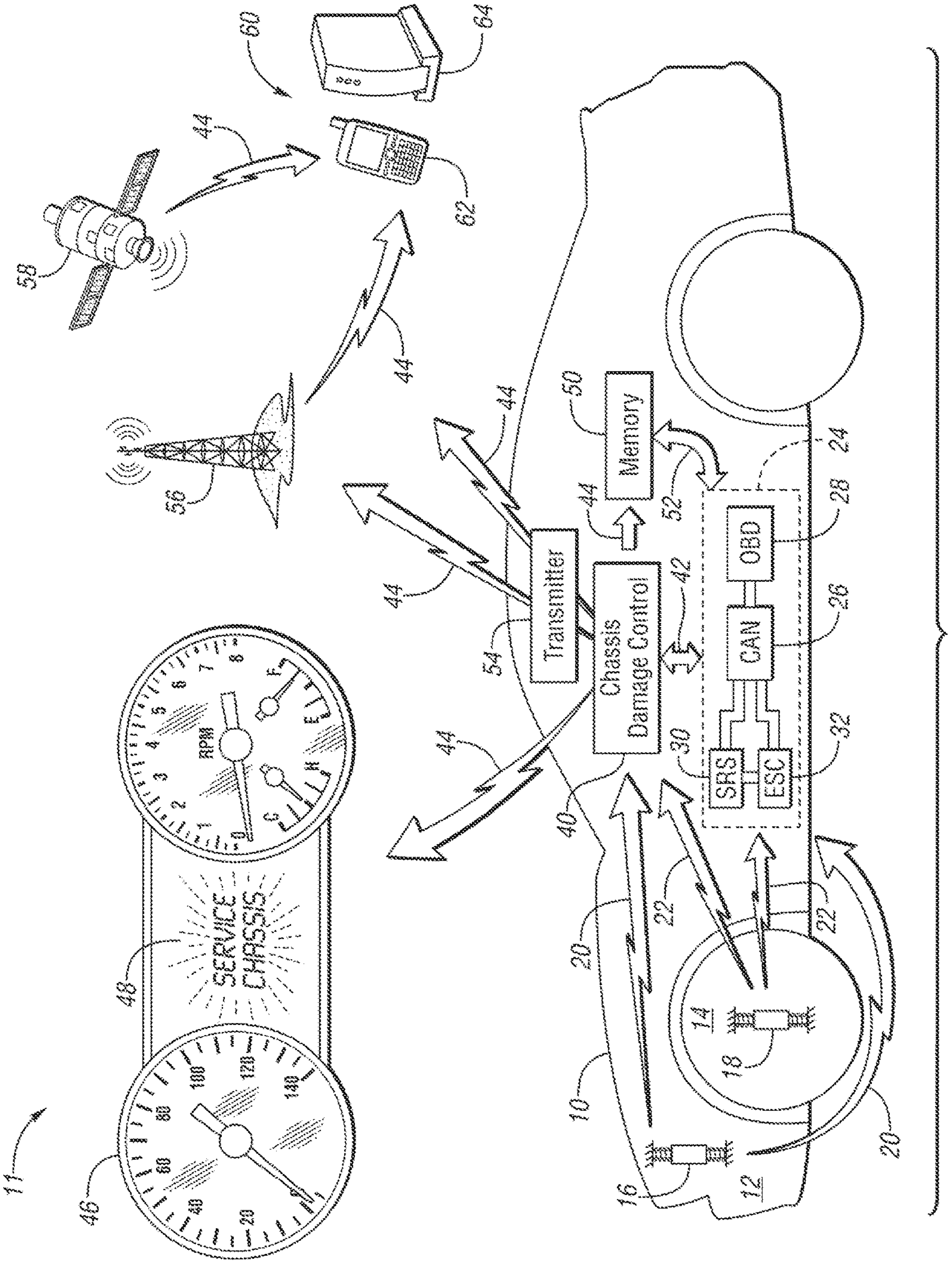
FIG. 1 is a schematic view of a chassis damage control system configured to receive acceleration data and send a notification signal if potential chassis damage has occurred.

FIG. 1 shows a representation of a vehicle 10 having a potential chassis damage notification system 11. The vehicle 10 is bifurcated into its sprung mass 12 and unsprung mass 14. A sprung accelerometer 16 is shown connected to the sprung mass 12 and an unsprung accelerometer 18 is shown connected to the unsprung mass 14. Alternatively, a single accelerometer 16 or 18 may be connected to either the sprung or unsprung mass 12, 14, a set of accelerometers 16 or 18 may be connected to either the sprung or unsprung mass 12, 14, or any combination of the above may be used with the system 11.

The unsprung mass 14 bears the weight of the vehicle 10. The unsprung mass 14 is made up of, and may also be referred to as, unsprung components 14. Unsprung components 14 include suspension and ground contact components such as wheels, tires, tracks, skis, hub and bearing assemblies, knuckles, brakes, and portions of driveshafts, springs, shock absorbers, suspension links, and steering systems. The sprung mass 12 is the weight of the vehicle supported by the unsprung components 14. The sprung mass 12 of the vehicle 10 is made up of, and may also be referred to as, sprung components 12. The sprung mass 12 includes vehicle components such as the frame, a body, an engine, and also may include items in the interior compartment of the vehicle such as passengers and cargo.

Each accelerometer 16, 18 measures acceleration of the component 12, 14, structure, or system to which it is attached. When a component 12, 14 impacts an object, the component 12, 14 may change its position or direction. A change in position or direction may include an acceleration. The sprung accelerometer 16 may provide the acceleration experienced by a sprung component 12 in a sprung-mass-acceleration signal 20. The unsprung accelerometer 18 may provide the acceleration experienced by an unsprung component 14 in an unsprung-mass-acceleration signal 22.

The unsprung-mass-acceleration signal 22 provides data of the level of impact an unsprung component 14 has with an object. The sprung-mass-acceleration signal 20 may also provide data of the level of impact an unsprung component 14 has with an object. The acceleration of the sprung component 12 is damped by the unsprung mass 14 within the travel limits of the suspension of vehicle 10. The suspension of vehicle 10 has "bottomed out" when the suspension comes into contact with the frame. In a situation where the suspension system has "bottomed out," the sprung-mass and unsprung-mass-acceleration signals 20, 22 may be the same.

The sprung-mass-acceleration signal 20 may coincide with a jolt felt by a driver within the vehicle 10 when the vehicle travels over an obstruction on the road surface, for example. The differential between accelerations may indicate the suspension travel relative to the frame and whether or not the suspension "bottomed out." A differential between the sprung-mass and unsprung-mass-acceleration signals 20, 22 may also indicate an impact of an unsprung component 14 with an object without the driver being aware of the impact or potential resulting damage.

Alternatively other sensors may be used in place of accelerometers 16, 18. Sensors used to detect position, velocity, acceleration, jerk, vibration or strain of components 12, 14 may be used with the potential chassis damage notification system 11. The sensors that may be used are of the kind capable of providing data to the potential chassis damage notification system 11 which may be analyzed to indicate that an unsprung component 14 has impacted an object and to a level which may have caused damage to the chassis of the vehicle 10. Examples of alternative sensors include position sensors, velocity sensors, jerk sensors, vibration sensors, shock-wave sensors, impact sensors, tactile sensors, strain gauges, pressure transducers, and piezoelectric transducers.

Vehicle 10 is shown with an internal communications network 24 that interconnects electronic systems within the vehicle. The network 24 may have certain protocols that are followed such as a Controller Area Network (CAN) 26 or a Local Interconnect Network (LIN). Special requirements for vehicle control may be included in the network 24 such as assurance of message delivery, assured non-conflicting messages, assured time of delivery, EMF noise resilience, and illumination of redundant routing. Additional demands on the network 24 must be minimalized to reduce costs.

Vehicle 10 is shown with an On-Board Diagnostics (OBD) connector 28 that has access to the network 24. Vehicle 10 is also shown with a Supplemental Restraint System (SRS) 30 and an Electronic Stability Control (ESC) system 32. The supplemental restraint system 30 may use accelerometers 16, 18 to aid in the detection of a collision event. The electronic stability control system 32 may also use accelerometers 16, 18, in combination with other sensors, to improve the safety of a vehicle's stability. Accelerometers 16, 18, may provide data 20, 22 to the internal communications network 24 and the data 20, 22 may be shared by the potential chassis damage notification system 11 as well as other vehicle systems.

A potential-chassis-damage controller 40 is provided within the vehicle 10. The controller 40 may be in communication with the network 24, as represented by arrow 42. The controller 40 may access data 20, 22 through the internal communications network 24. However, a network 24 is not required for the system 11 to function. The accelerometers 16, 18 may be independent from other systems and the controller 40 may directly receive the signals 20, 22 from one or both accelerometers 16, 18.

The controller 40 compares the acceleration data 20, 22 of at least one accelerometer 16, 18 to a pre-set threshold value or range of values that indicate potential damage to the chassis of vehicle 10. The threshold value or potential-damage range may be unique for each kind of accelerometer 16, 18 and for each individual accelerometer 16, 18 depending on which sprung or unsprung component 12, 14 they are attached to. The controller 40 may also compare a differential between a sprung-mass acceleration signal 20 and an unsprung-mass acceleration signal 22. The controller 40 sends out a potential-chassis-damage signal 44 if the acceleration data 20, 22 is within the potential-damage range or above the threshold value.

The potential-damage range has a lower limit set higher than acceleration experienced by the accelerometers 16, 18 during normal vehicle use to avoid unnecessary notifications. The potential-damage range has an upper limit set lower than the value of acceleration data 20, 22 that would indicate a collision event sufficient to set off a supplemental restraint. There is no need to set the level above the level sufficient to trigger a supplemental restraint response because the vehicle will be ordinarily serviced after such a collision event. Moreover, there may be no need for a specific "potential-damage notification" if supplemental restraints have been set off. This will also reduce computational redundancy and allow the supplemental restraint system 30 to operate without competition from the potential chassis damage notification system 11 or provide additional demands on the network 24. A portion of the potential-damage range may be advantageously set at an acceleration value measured during an event that may cause chassis damage yet may not be discernible or detectable by the driver. For example, the potential-damage range may include an acceleration that the sprung accelerometer 18 experiences when the vehicle 10 drives straight-on over a 7 inch straight-edge curb at 15 miles per hour, even if chassis damage is not discernible or detectable by the driver.

The controller 40 may send a potential-chassis-damage signal 44 to an instrument panel 46. The instrument panel 46 may have a digital display or light 48 which notifies the driver of potential chassis damage. The instrument panel 46 may provide a 'service chassis' indication that is communicated to the driver through the digital display or by illuminating the light 48 in response to receiving the potential-chassis-damage signal 44.

The controller 40 may send the potential-chassis-damage signal 44 to a memory storage device 50. The potential-chassis-damage signal 44 may include the original acceleration data 20, 22 that is above the threshold value or within the potential-damage range. The potential-chassis-damage signal 44 may be saved in the memory storage device 50 with a time stamp to be accessed at a later time. The potential-chassis-damage signal 44 may also be saved in the memory storage device 50 with GPS data, or the like, providing location information of the vehicle 10 at the time of the event. The potential-chassis-damage signal 44, or the data 20, 22 that is within the potential-damage range, may be recalled from the memory storage device 50 directly through a separate communication tool (not shown). The memory storage device 50 may also be in communication with the network 24, as indicated by arrows 52. The potential-chassis-damage signal 44, or data 20, 22 that is within the potential-damage range, may be accessed through the OBD connector 28.

The vehicle 10 may be equipped with a transceiver or transmitter 54 and the controller 40 may be in communication with the transmitter 54 and capable of sending the potential-chassis-damage signal 44 outside of the vehicle 10 through the transmitter 54. The transmitter 54 may be configured to send the potential-chassis-damage signal 44 via methods such as a cellular network or radio frequency broadcast, as represented by tower 56, or a satellite network as represented by satellite 58.

A receiver 60 located outside of the vehicle 10 may be in communication with the tower 56 or satellite 58. The remote receiver 60 may be inside a portable electronic device 62, such as a cellular phone, satellite phone or tablet. The remote receiver 60 may also be connected to and accessible via the internet, as represented by server 64. The remote receiver 60 receives the potential-chassis-damage signal 44 and may actively notify a user outside of the vehicle 10. The remote receiver 60 may also merely provide access to information pertaining to the potential chassis damage of the vehicle 10.

Alternatively, the potential-chassis-damage signal 44, or the acceleration data 20, 22 above the threshold value or within the potential-damage range, may be directly transmitted to a receiver 60 without the use of a radio frequency, cellular or satellite network 56, 58. Examples of other forms of wireless transmission that may also be used include infrared, ultrasonic, direct transmission of a radio frequency without use of a network, citizen band and Bluetooth transmissions.

The potential chassis damage notification system 11 notifies drivers of vehicles of potential chassis damage. This may be useful when there is potential damage to the chassis which is neither discernible nor detectable by a driver, or when the vehicle travels over an obstruction and the driver is unsure whether doing so potentially damaged the chassis. This may also be useful for drivers of vehicles that are shared by multiple drivers. A driver may be notified by the system 11 of potential chassis damage that occurred when a prior user operated the vehicle. Pool and rental vehicles may be transferred between drivers without concern that a subsequent driver would be operating the vehicle with potential chassis damage. In the case where the rental vehicle is checked out and rented by the hour, the network that manages and controls the rental vehicles could place a hold on the vehicle and not allow it to be rented or driven until a service check is performed to verify that the vehicle is safe to operate.

In addition to the solutions described above for discerning whether or not there has been potential damage done to the chassis and notifying the driver, the description below focuses on validating and authenticating the potential-damage signals to assure that there was, in fact, potential damage done to the chassis. The validation methods described below are intermediate validation steps that receive the chassis data (e.g., acceleration data) described above. Further authentication methods can be included that authenticate whether that the data is in fact indicative of a potential-chassis-damage impact event, sufficient to render the potential-chassis damage notification to the operator of the vehicle. These validation and authentication methods improve the accuracy of the potential-chassis damage notifications, reducing false positive outputs for example.

According to one embodiment of signal validation, the controller 40 utilizes data from the restraint control module (RCM). As described above, the vehicle can be equipped with a Supplemental Restraint System (SRS) 30. This SRS 30 is equipped with accelerometers at various locations in the vehicle. The RCM primarily uses signals from the accelerometers to detect and validate the occurrence of a collision event. For example, the accelerometers can enable the RCM to detect impact events that would not register at a magnitude high enough to trigger the restraints such as the airbags, but would qualify as a potentially-damaging impact. The signal content delivered to the RCM may be processed and analyzed similar to the description provided above regarding the sprung- and unsprung-mass data collection and comparison to two thresholds that are lower than a magnitude that would set off the supplemental restraints.

Figure 2A:
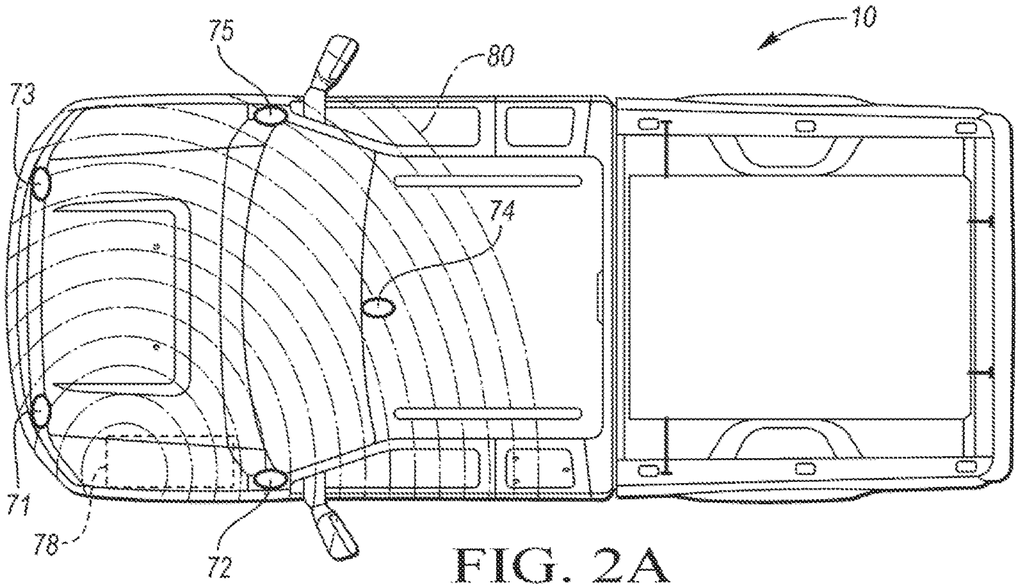
FIG. 2A is a top schematic view of a vehicle having various accelerometers at different radial distances from a front left wheel, according to one embodiment.
Figure 2B:
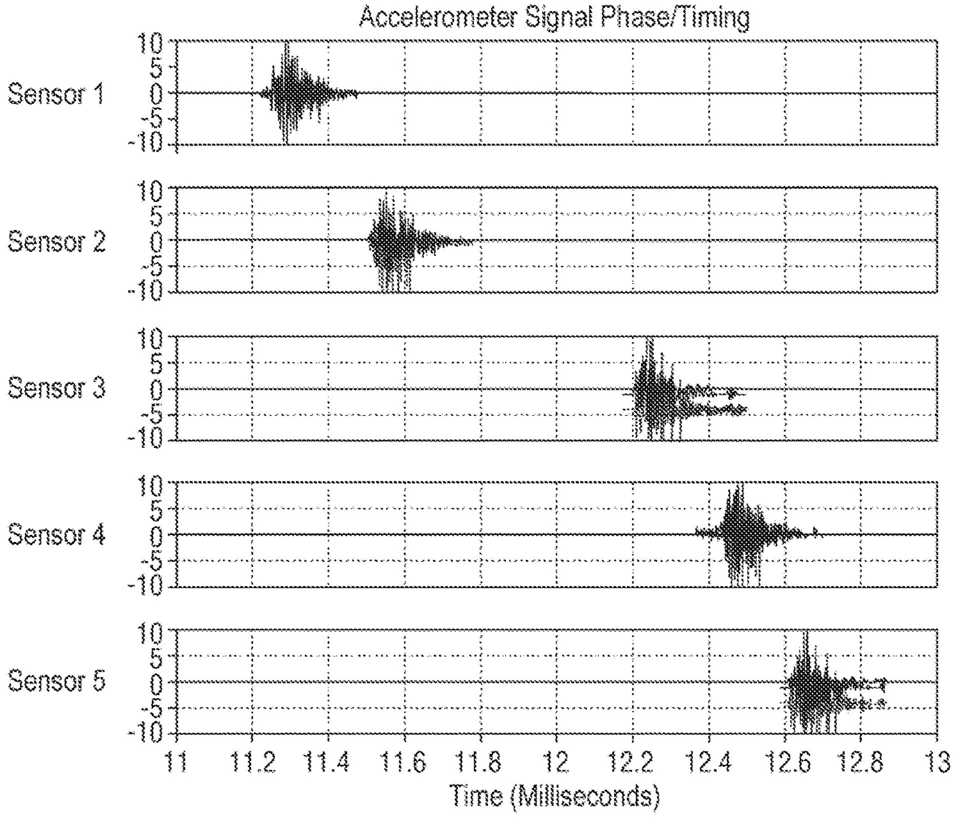
FIG. 2B is a graphical view of acceleration data output by the sensors of FIG. 2A to validate the presence of an impact at the front left wheel.

Another embodiment of potential-chassis-damage validation and verification is illustrated in FIGS. 2A and 2B. In this embodiment, once the vehicle is subject to an impact event, the force of the impact travels to various sensors. The amount of time that the impact force is sent amongst the various sensors allows the control system to determine where the origin of the impact event took place in order to validate the potential-chassis damage data. FIG. 2A illustrates a vehicle (such as the vehicle 10 of FIG. 1). The vehicle 10 is shown with a plurality of accelerometer sensors, such as sensor-1 71, sensor-2 72, sensor-3 73, sensor-4 74, and sensor-5 75. The accelerometers are configured to detect changes in acceleration at each sensor due to impact events ranging from slight impacts (e.g., running over a curb) to more severe (e.g., crashes).

In the embodiment shown in FIG. 2A, an impact event occurs at the front left wheel 78 as that wheel travels over a curb, for example. Lines 80 illustrate the impact force as it travels from the point of impact at the front left wheel 78. The sensors 71-75 detect changes in acceleration as the impact force moves to each sensor's location. The corresponding signals output by the accelerometers to the controller are shown in FIG. 2B.

The potential-chassis damage control system described above would then be implemented by the controller. For example, a potential-chassis-damage signal is output if the acceleration at the sensors 16, 18 (FIG. 1) is between the two thresholds. However, before any potential-chassis-damage signal is outputted (either to the driver or to an external server), the potential-chassis damage is validated. To validate, the controller analyzes the acceleration signals output by the sensors 71-75 (FIG. 2B). The controller can infer that the impact event occurred at the front left wheel 78 based on the pattern of acceleration signals being consecutively received from sensor-1, sensor-2, sensor-3, sensor-4, and then sensor-5.

In an exemplary embodiment of an algorithm implemented by the controller, first the controller compares the acceleration signals from the sensors 16, 18 (FIG. 1) to the two thresholds, as explained above. Then, if the acceleration is between these two thresholds, the controller validates a potential-chassis-damage event by comparing the time of acceleration signals output by sensors 71-75. If the timing between the signals output by the sensors 71-75 indicates that the impact event originated at one of the front left or front right wheels (e.g., the impact force travels consecutively to sensors that are further away from a wheel), then the potential-chassis damage is validated. Once validated, the potential-chassis-damage signal can be output according to the methods described above.

Figure 3A:
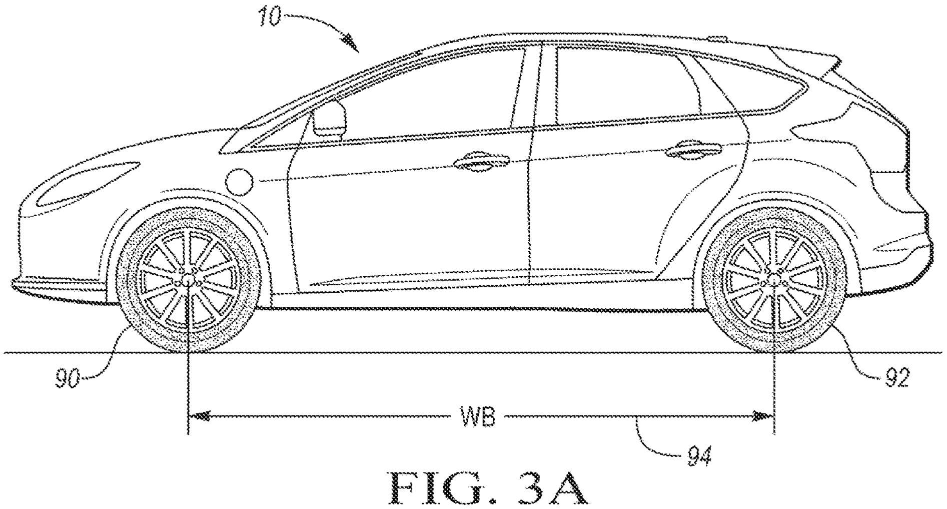
FIG. 3A is a side view of a vehicle with a wheelbase preprogrammed into a computer, according to one embodiment.
Figure 3B:
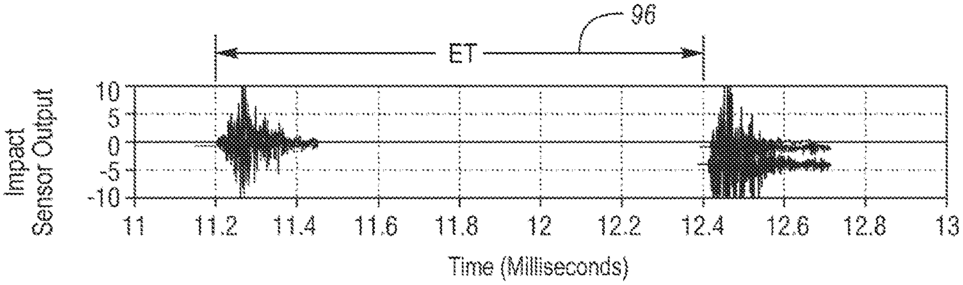
FIG. 3B is a graphical time-based representation of acceleration data sensed and reported by one or more on-board accelerometers, with the first pulse being a result of impact from the front axle and the second pulse being a result of impact from the rear axle.

Another embodiment of potential-chassis-damage validation and verification is illustrated in FIGS. 3A and 3B. In this embodiment, the potential-chassis damage due to an actual road source is validated by comparing the actual or detected vehicle speed to a calculated vehicle speed that is calculated by comparing the difference in acceleration signals output by two sensors. In one embodiment, the two sensors are located respectively at or near a front wheel 90 and a back wheel 92. The acceleration signals can derive from the sensors 18, or can derive from other accelerometers about the vehicle. As the vehicle 10 travels over an impact structure on the road surface, the signals output from one or more of the accelerometers is shown in FIG. 3B according to one example, with the first pulse of acceleration due to an impact of the front axle with an object in the road, and the second pulse of acceleration due to an impact of the rear axle with the object.

To validate the potential-chassis damage, first the controller is preprogrammed with a distance representing the wheelbase (WB) 94. The wheelbase 94 is the known distance between the front axle and the rear axle. The wheelbase can vary from vehicle to vehicle, and so the controller can be pre-programmed with a wheelbase specific to each vehicle. An elapsed time (ET) 96 is determined by the controller as the vehicle 10 travels over the impact structure on the road. The elapsed time 96 represents the amount of time between the moments that the impact is initially detected by one or more of the sensors indicating impact at the front wheel 90 (i.e., the first pulse of acceleration) and then the rear wheel 92 (i.e., the second pulse of acceleration). With the elapsed time 96 determined, the calculated vehicle speed can be derived as the wheelbase over the elapsed time, i.e.:

$$\frac{\frac{WB_{(in)}}{12}}{ET\ (\text{sec})} = \text{Calc\_Vel (fps)}$$

In one embodiment, the wheelbase is 104.3 inches, and the elapsed time is 0.102 seconds. This yields a calculated velocity of 85.2 fps. The vehicle speed is also detected, via conventional vehicle speed sensors and methods, as being 84.3 fps during the time of impact. The controller compares the calculated velocity to the detected actual velocity and, because the difference between these two values is relatively small, the possible-chassis damage is validated. According to one embodiment, a validation occurs when the difference between the calculated velocity and the actual velocity is below a predetermined threshold (for example, 2%).

Figure 4A:
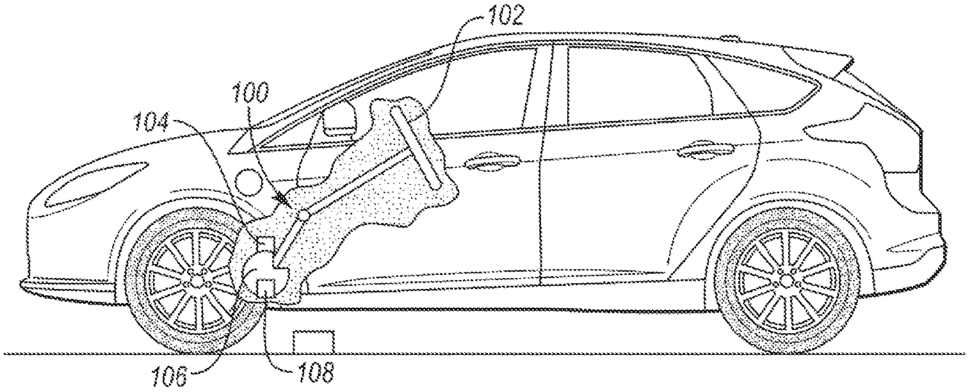
FIG. 4A is a side view of the vehicle with a schematic of an electronic power assist steering (EPAS) system according to one embodiment.
Figure 4B:
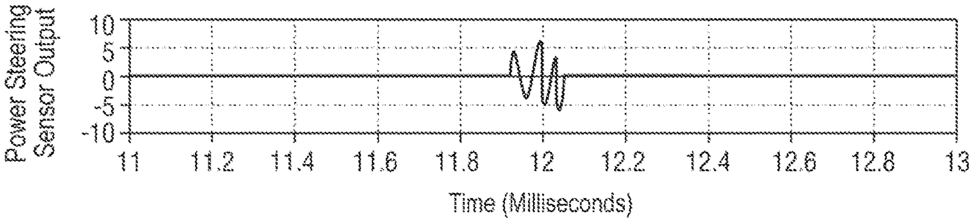
FIG. 4B is a graphical view of various types of data output by one or more sensors in the EPAS system to validate and authenticate the presence of potential-chassis damage as forces are realized in, or experienced by, the EPAS.

Another embodiment of potential-chassis-damage validation and verification is illustrated in FIGS. 4A and 4B. In this embodiment, the electric power assist steering (EPAS) system 100 is used for the validation and verification. The EPAS system 100 is illustrated in FIG. 4A. The EPAS system 100 includes structural components known in the art, such as a steering wheel 102, a steering wheel angle/position sensor (not shown), a steering wheel torque sensor 104, a motor 106 configured to assist in turning the wheel, a motor torque sensor 108, and an associated electronic control unit (ECU) (not shown). The ECU can be in communication with the controller 40. Other components are contemplated as part of this EPAS system, as known to one of skill in the art.

First, an impact event is detected using methods described above, while, for example, the vehicle is traveling over an object in the road. Prior to the potential-chassis-damage signal being output, validation using the EPAS system is accomplished. In one embodiment of EPAS validation, data is pulled from the ECU (or associated CAN bus) to look for transients, or spikes, in the signals output by the various sensors above. For example, the controller can validate by observing a transient occurring in one or more of the steering wheel torque (as indicated by data from the steering wheel torque sensor 104), steering wheel angle/position (as indicated by data from the steering wheel angle/position sensor), and magnitude of current provided to the motor 106. If a transient, pulse, spike, or associated data is observed to exceed a threshold and to have occurred at a point in time coincident with other various and observable signal sensors, an impact event is validated. The potential-chassis-damage signal can then be output according to the methods described above.

One example of a transient or spike in EPAS system is illustrated in FIG. 4B. This exemplary data can be changes in steering wheel torque, steering wheel angle/position, or magnitude of current provided to the motor.

It should be understood that the disclosure above is not intended to be limited only to driving scenarios in which the vehicle is in fact driving. The disclosure above can also be implemented during times in which the vehicle is parked. For example, the accelerometers can detect potential chassis damage in any of the above-referenced manners while the vehicle is parked. The controller can determine that a vertical acceleration event has occurred between the lower and upper thresholds, indicating potential damage done to the chassis while the vehicle is parked. This data, coupled with data indicating the vehicle is parked, can be wirelessly sent to the server, or recorded on the vehicle itself. This would indicate that damage was done to the vehicle not from a collision possibly at the fault of the user, but due to a third party impacting the vehicle while out of the control of the user.

Another embodiment of potential-chassis-damage validation and verification utilizes the continuously controlled damping (CCD) system. The CCD system is a system that can actively adjust the suspension and damping system based on vehicle and environment parameters while driving. A plurality of sensors continuously monitor suspension, steering, braking and body motions. A CCD controller then responds to this data by adjusting the suspension and damping for actively and instantly controlling the driveability of the vehicle. The CCD system can also include a pothole detection (PHD) system that includes sensors that detect upcoming potholes. The CCD then adjusts the suspension system prior to traveling over the pothole. Chassis-damage validation can then occur by observing transients or spikes in one or more of any of these sensors that are used in the CCD system and the associated CAN bus.

The control systems and algorithms explained above use both validation and authentication. Once acceleration is detected to be between the two thresholds, the controller determines that a potential-chassis-damaging impact event occurred. The controller can then validate the potential-chassis-damage by looking to the data received by one or more other accelerometers to determine whether or not (e.g., in a binary fashion) an impact event occurred. The controller can also authenticate the potential-chassis-damage by using the actual magnitude, frequency, and other factors described above from multiple sensors in a synergistic fashion to determine that not only did the impact event occur, but that the impact event was one that is classified as potentially damaging the chassis. In one embodiment, both validation and authentication can collectively be referred to as "validating" the potential-chassis damage.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:

an accelerometer for detecting acceleration of a chassis component;

additional accelerometers separate from the chassis component; and a controller programmed to receive a potential chassis damage signal from the accelerometer indicating acceleration between a lower threshold and an upper threshold associated with triggering a supplemental restraint, validate the potential chassis damage signal based on a time between signals received from the additional accelerometers, and output a message to a display in response to the validation.

2. The vehicle of claim 1, wherein the one or more additional accelerometers are located at different distances from a wheel.

3. The vehicle of claim 2, wherein the validation of the potential chassis damage signal is based on receiving sequential signals from the additional accelerometers in a sequence that indicates an impact event occurring at the wheel.

4. The vehicle of claim 1, wherein the additional accelerometers include a front-axle accelerometer and a rear-axle accelerometer.

5. The vehicle of claim 1, wherein the controller is programmed to validate the potential chassis damage by comparing an actual vehicle speed to a calculated vehicle speed, the calculated vehicle speed being based on an elapsed time between a first acceleration signal being output by one of the additional accelerometers, and a second acceleration signal being output by another of the additional accelerometers.

6. The vehicle of claim 1, further comprising an electronic power assist steering (EPAS) sensor, wherein the controller is programmed to validate the potential chassis damage based on an oscillation of data output from the EPAS sensor.

7. A method comprising:

receiving a signal from an accelerometer indicating acceleration of a chassis component;

validating potential chassis damage based on (i) the acceleration being between a lower threshold unlikely to cause chassis damage and an upper threshold likely to cause chassis damage, and (ii) a time between signals received from additional sensors being consistent with potential chassis damage; and outputting a signal to a display in response to the validating.

8. The method of claim 7, wherein the additional sensors include accelerometers located at different distances from a wheel.

9. The method of claim 8, wherein the time between signals received from the additional sensors is sequentially beginning with one of the additional sensors closest to the wheel and continuing to the additional sensors farther from the wheel, indicating an impact event occurring at the wheel.

10. The method of claim 7, wherein the additional sensors include a front-axle accelerometer and a rear-axle accelerometer.

11. The method of claim 7, further comprising determining a calculated vehicle speed based on an elapsed time between a first acceleration signal being output by one of the additional sensors and a second acceleration signal being output by another of the additional sensors, wherein the validating includes comparing an actual vehicle speed to the calculated vehicle speed.

12. The method of claim 7, wherein the additional sensors includes an electronic power assist steering (EPAS) sensor, and the validating includes detecting an oscillation from the EPAS sensor.

13. The method of claim 12, wherein the EPAS sensor is an EPAS motor torque sensor and the detecting includes detecting an oscillation of motor torque from the EPAS motor torque sensor.

14. A vehicle comprising:

a primary accelerometer configured to detect vertical acceleration of a front wheel;

a plurality of secondary accelerometers; and a controller programmed to output a potential chassis damage message to a display in response to (i) the vertical acceleration being positive but less than a triggering threshold for a supplemental restraint, and (ii) acceleration signals received from the secondary accelerometers in a sequence based on distance from the front wheel.

15. The vehicle of claim 14, further comprising a rear wheel and an associated rear-wheel accelerometer configured to detect vertical acceleration of the rear wheel, wherein the controller is programmed to output the potential chassis damage message to the display in further response to a vehicle speed signal being substantially similar to a calculated vehicle speed, the calculated vehicle speed being based on an elapsed time between a first acceleration signal being output by the primary accelerometer and a second acceleration signal being output by the rear-wheel accelerometer.

16. The vehicle of claim 14, further comprising an electronic power assist steering (EPAS) sensor, wherein the controller is programmed to output the potential chassis damage message in further response to detecting an oscillation of data output from the EPAS sensor.

17. The vehicle of claim 16, wherein the EPAS sensor is a steering wheel angle sensor and the detecting includes detecting an oscillation of steering wheel angle data output from the steering wheel angle sensor.

18. The vehicle of claim 16, wherein the EPAS sensor is a EPAS motor torque sensor and the detecting includes detecting an oscillation of motor torque output from the EPAS motor torque sensor.

19. The vehicle of claim 14, wherein the secondary accelerometers includes a first accelerometer at a first distance from the wheel, a second accelerometer at a second distance from the wheel exceeding the first distance, and a third accelerometer at a third distance from the wheel exceeding the second distance, and wherein the controller is programmed to output the potential chassis damage message in response to acceleration fluctuations being received sequentially from the first accelerometer, the second accelerometer, and the third accelerometer.

* * * * *